Patented Feb. 14, 1933

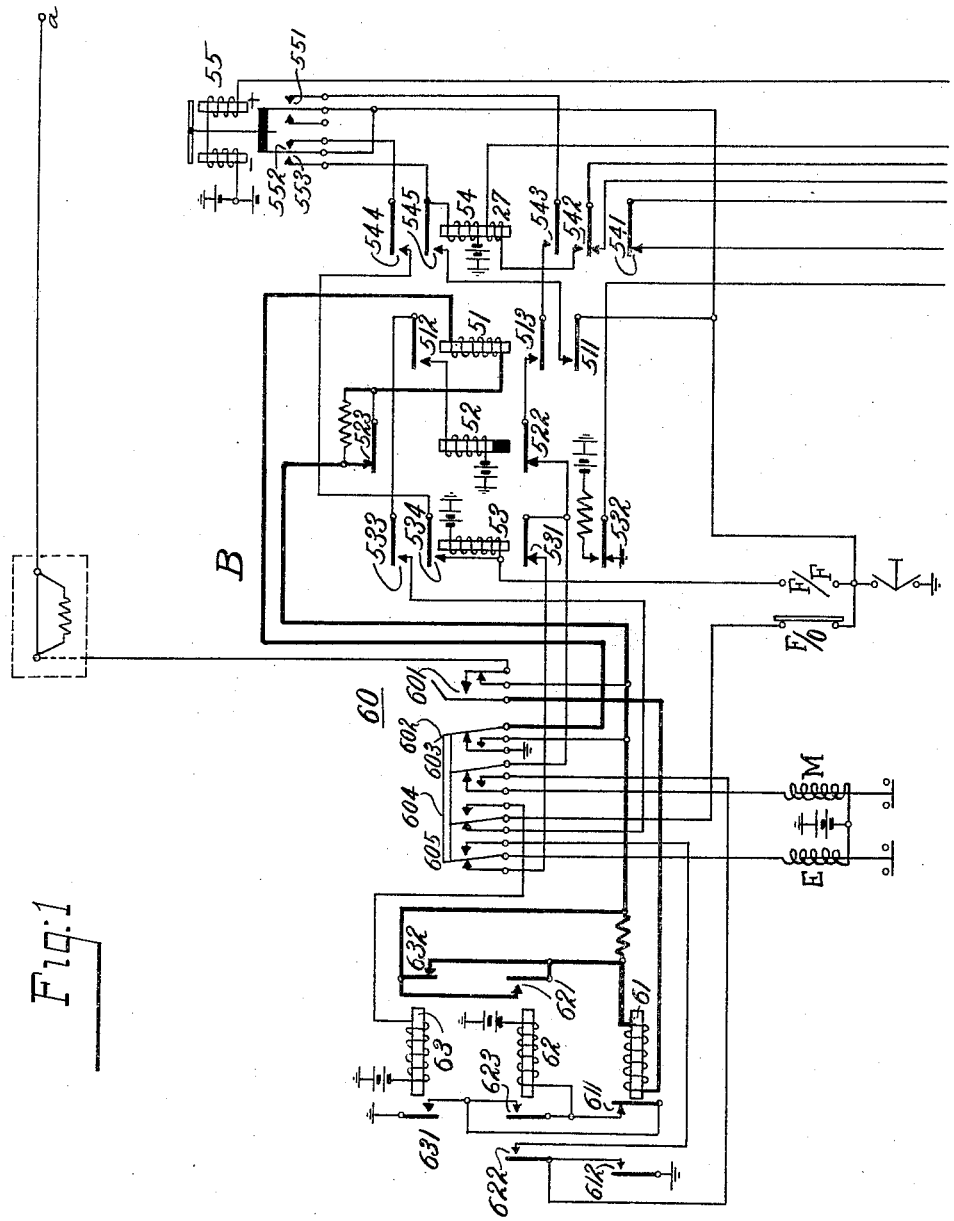

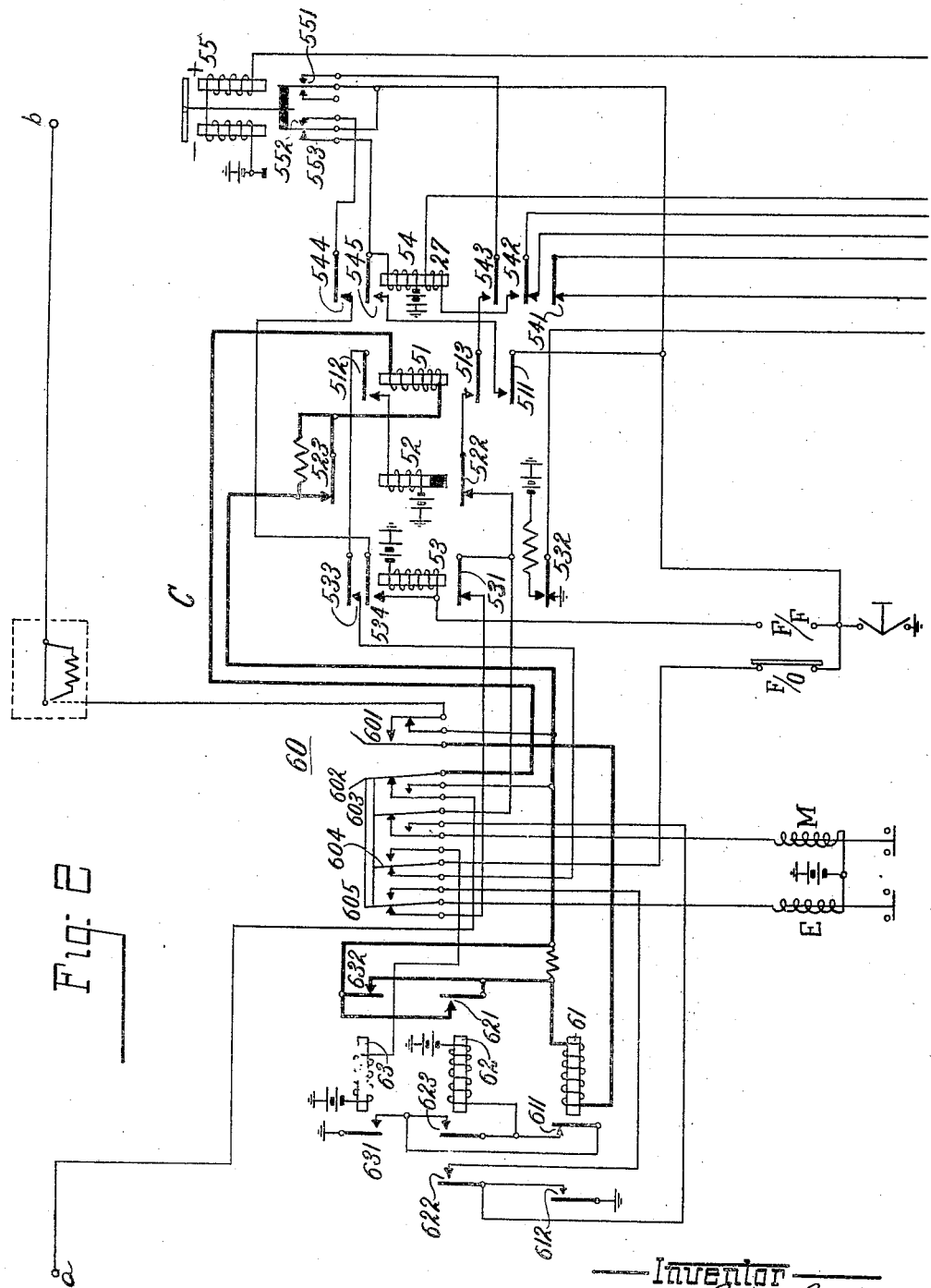

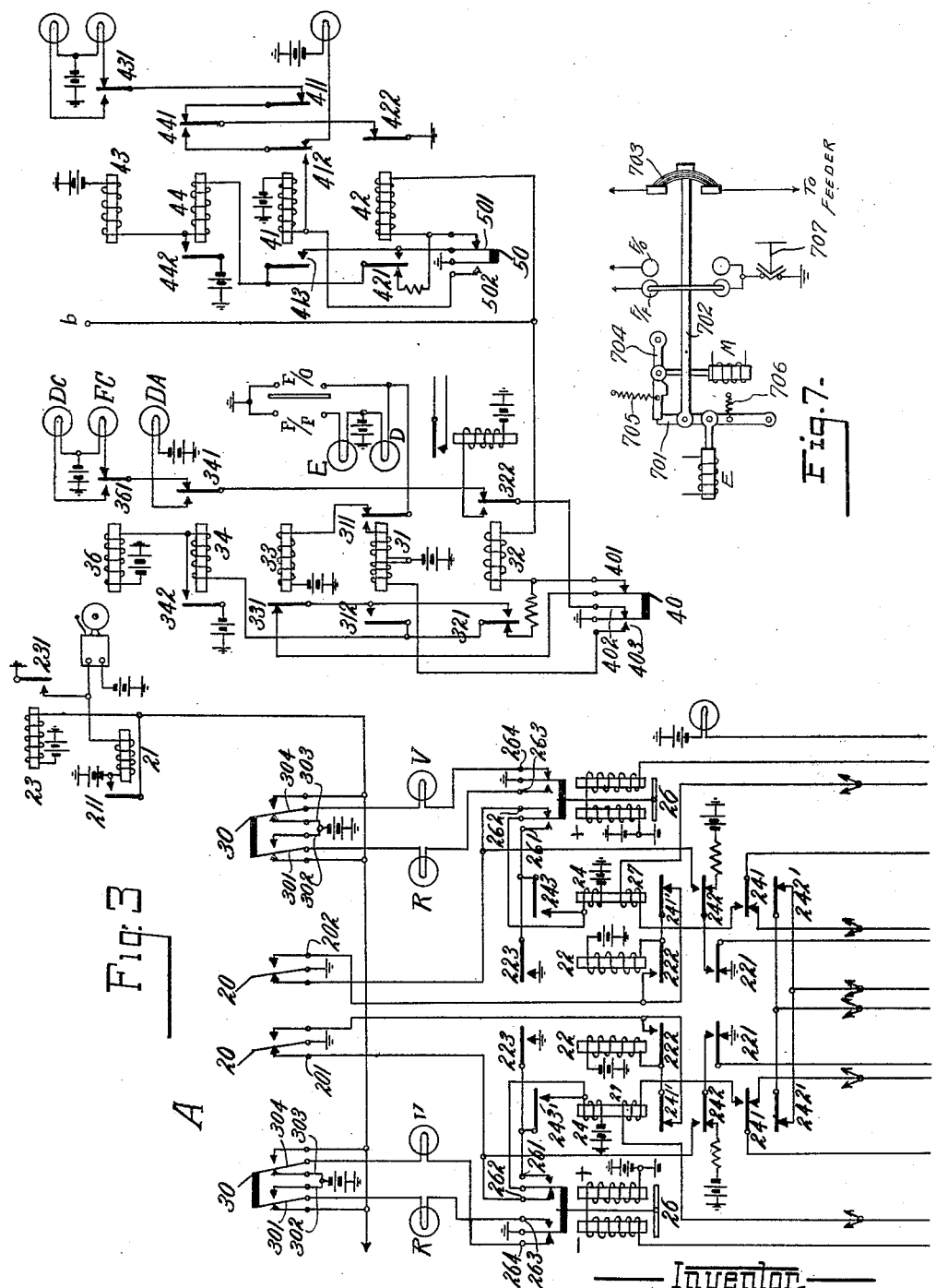

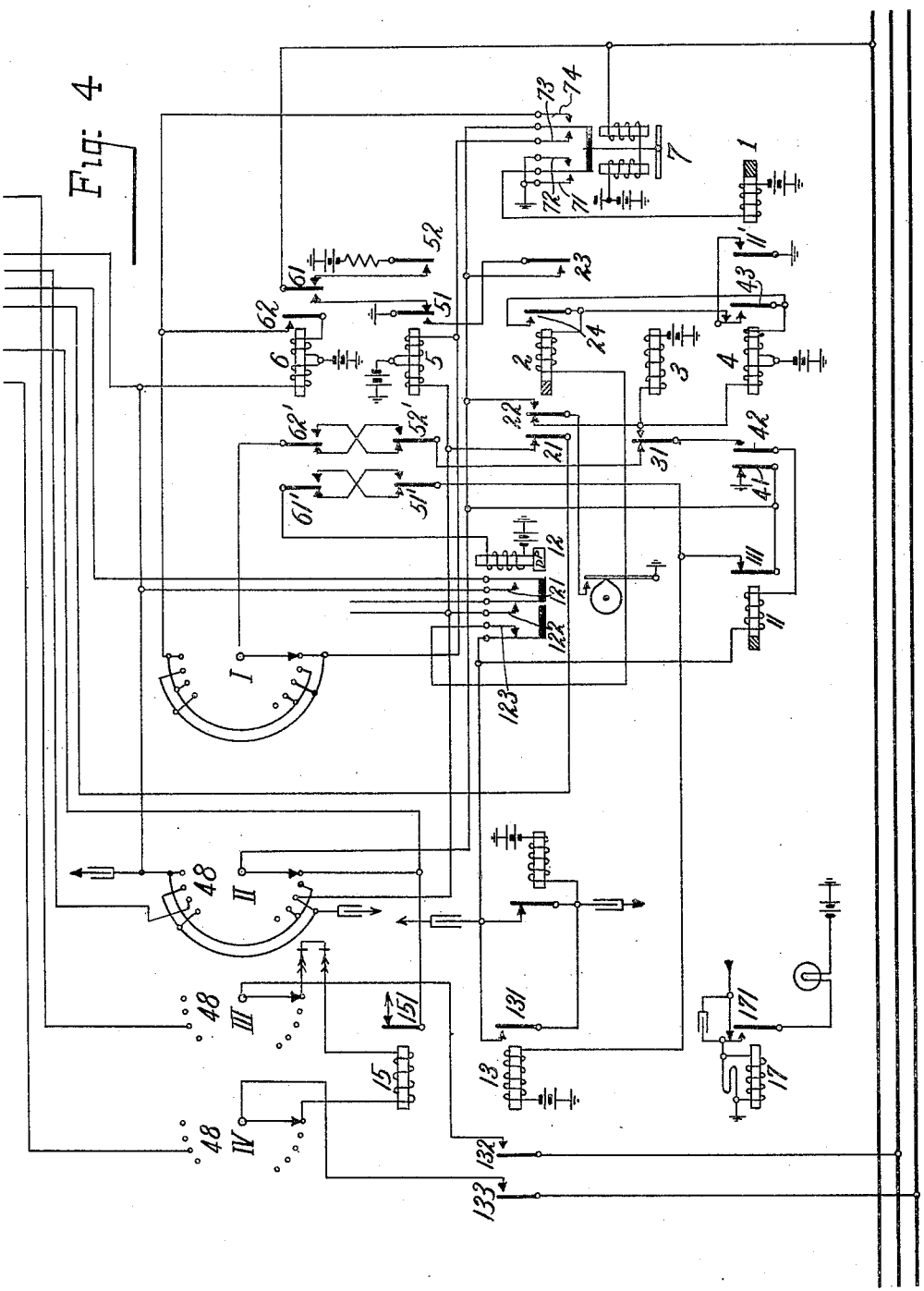

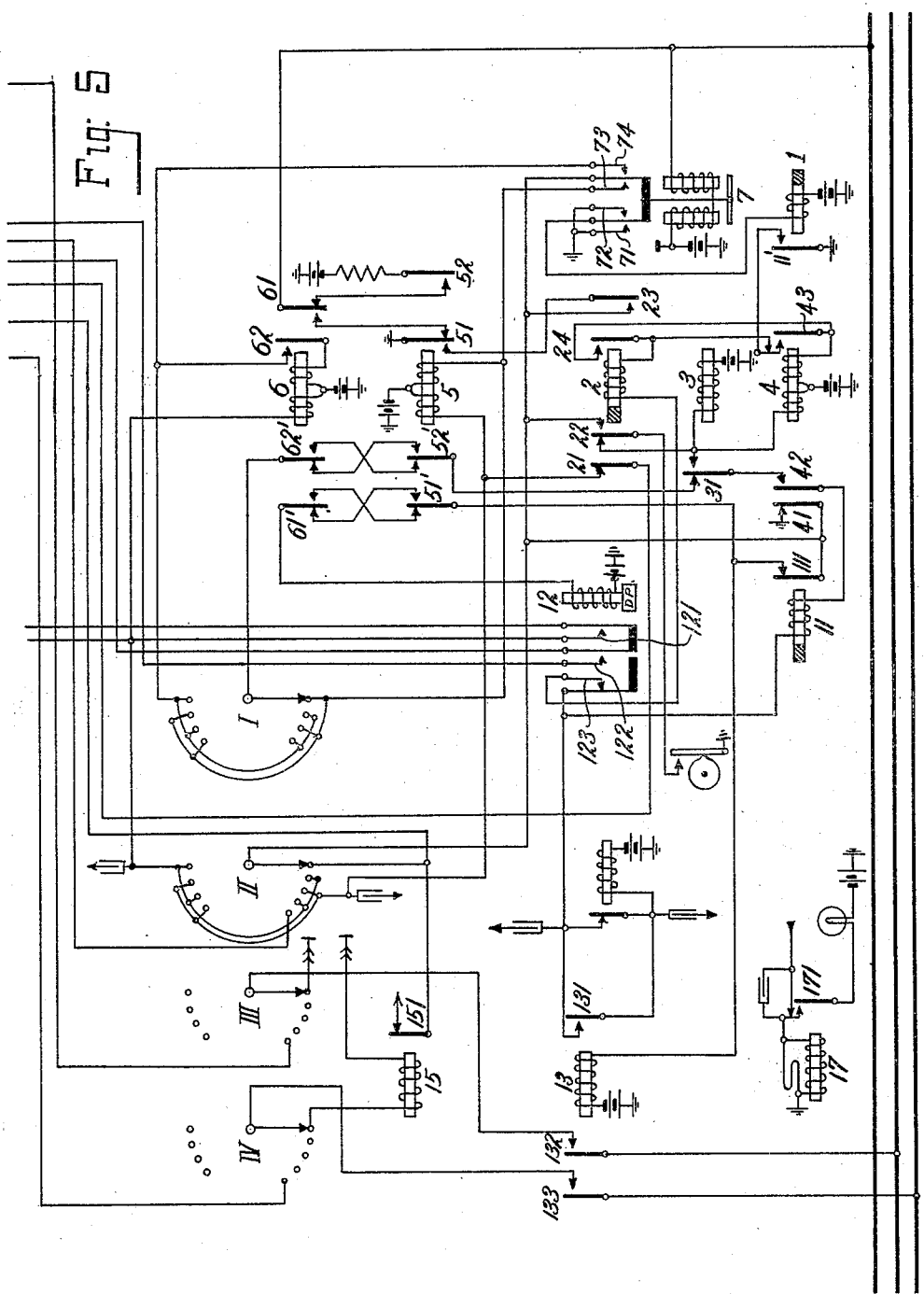

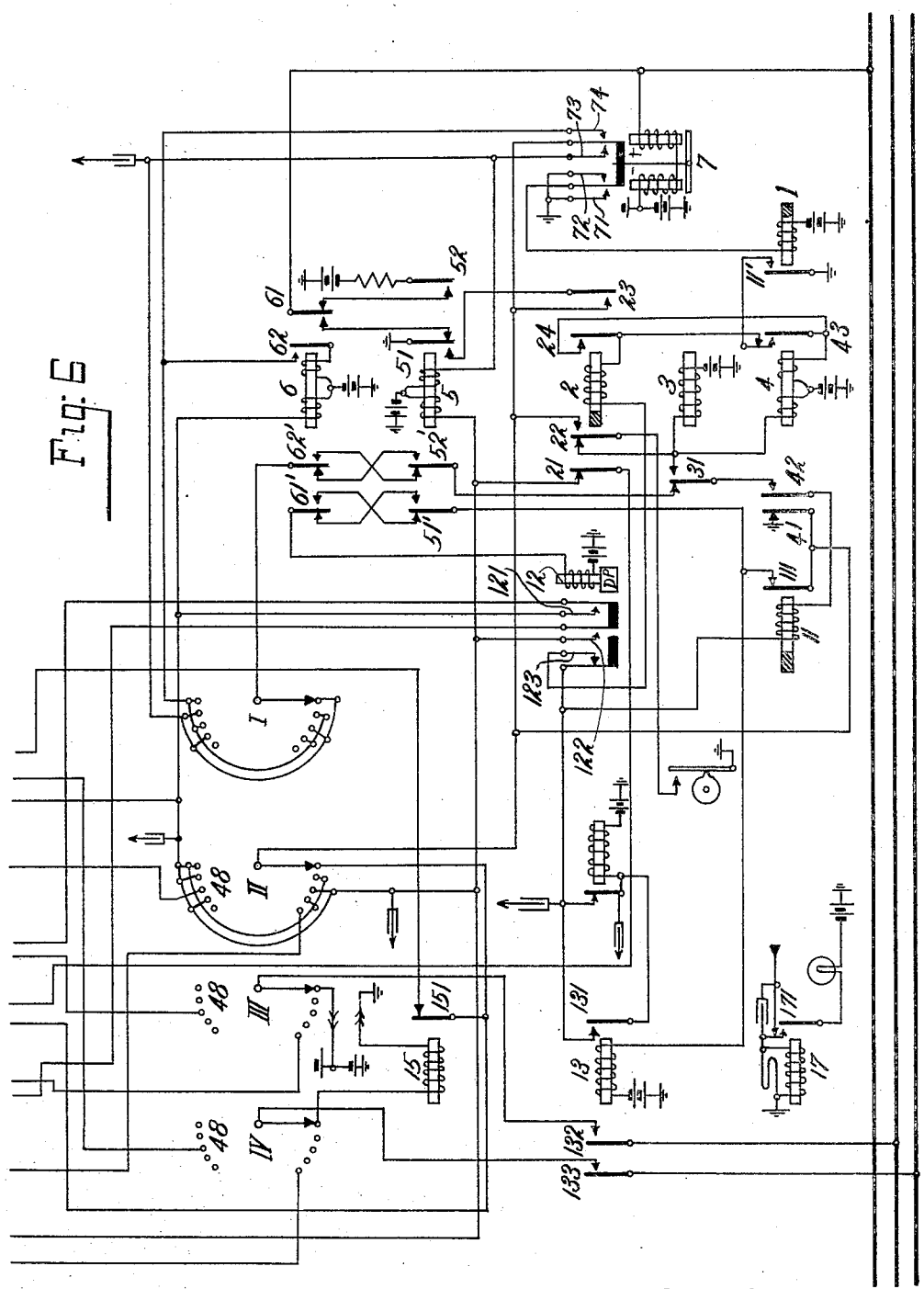

1,897,718

UNITED STATES PATENT OFFICE

ROGER BATAILLE, OF PARIS, FRANCE, ASSIGNOR, BY MESNE ASSIGNMENTS, TO ASSOCIATED ELECTRIC LABORATORIES, INC., OF CHICAGO, ILLINOIS, A CORPORATION OF DELAWARE

REMOTE CONTROL SYSTEM

Application filed September 7, 1926, Serial No. 133,858, and in France September 9, 1925.

The present invention relates in general to remote control systems, more particularly to such systems in which a selector switch in each of a plurality of substations is stepped in synchronism with a common sending device to select a particular switching device, and the principal object of the invention, briefly stated, is the provision of a new and improved system of this kind, the improvements adding to the reliability and ease and operation of the system.

Systems of this kind have been devised heretofore, operating under the so-called tandem principle, in which a plurality of substations are controlled from one control station over trunk conductors leading from the control station to the substations in multiple, the number of conductors in this trunk varying with the various systems. In the present invention a three-conductor trunk is employed. In systems of this kind, the necessity of keeping the selector switches in exact synchronism has been recognized, and numerous arrangements have been employed to accomplish this end. As an object of my invention, I provide a new and improved synchronizing arrangement, in which the synchronization is obtained through reversed battery impulses, transmitted from the control station and repeated from each substation to the next substation outward from the control station. By this arrangement, the reliability of the operation of the last substation on the trunk is the same as that of the first substation on the trunk. The number of conductors used in the trunk in a system of the present invention is fixed regardless of the number of stations on the trunk.

In certain classes of installation of systems of this kind, it is necessary to provide an arrangement for the immediate release of certain or all of the circuit breakers connected to a bus bar, and in accomplishment of this purpose, I provide as a further object of the present invention, a new and improved general release arrangement, by means of which the immediate release of all the engaged devices can be effected. In accordance with this object of the invention, a circuit can be arranged so that the releasing or automatic opening of one of the circuit breakers will cause the opening of all of the other circuit breakers attached to that circuit as well as the opening of the main circuit breaker which places potential on that circuit. Likewise the manual release of any one circuit breaker can be made to cause the release of all the circuit breakers connected to the circuit, and I have provided numerous convenient points for manually controlling this general release.

In installations of certain types, it is necessary that the control of the circuit breakers be maintained at all times, that is, it would be very disadvantageous if a momentary break down of the selecting and controlling circuit would render the despatcher or attendant at the controlling station unable to control any or all of the circuit breakers on the route. Accordingly, as a further object of my invention, I have provided an arrangement whereby the despatcher may control certain or all of the circuit breakers on a route over an auxiliary circuit independent of the main selecting and controlling circuit in case the latter is faulty, the control which is able to exercise consisting in being able to close and open the breakers as desired.

As a further object of my invention, I provide an arrangement for withdrawing one or more of the circuit breakers from the control of either the general release circuit or the selective switch main control circuit, so that that circuit breaker may be adjusted or repaired without danger of it being selected and operated by the distance despatcher during the performance.

As a further object of my invention I provide an improvement in the synchronically operated switch circuit, whereby if one of the switches gets out of step with the remainder of the switches, that switch is operated around to its normal position under the control of a local circuit, which local circuit exercises control over the other switches of the system to bring them around to their normal positions without selecting or operating any devices enroute.

Further objects of my invention, not specifically mentioned here, will be apparent from a reading of a detailed description and claims which follow:

To illustrate my invention, I have shown and will describe an embodiment of it arranged to control the application of current from a feeder wire to the third rail or trolley wire of an electrified railway, this embodiment being made by way of example only.

In the following description a relay which carries contacts is indicated by reference such as 22 and the third contact of the relay by reference 223.

Referring to the drawings, Figures 1 and 4 joined together indicate one controlled station, Figures 2 and 5 joined together and placed to the right of Figures 1 and 4 indicate a second controlled station, while Figures 3 and 6 placed to the right of Figures 2 and 5 indicate the controlling station, Fig. 7 represents a circuit breaker which can be controlled over the circuits shown in the other figures.

Referring now to Figs. 1 and 4 in more detail, these figures show the apparatus at one substation of the system, this substation being the one furthermost from the controlling station. The trunk conductor over which control and supervision is exercised from another station terminates in this station to control the selecting switch comprising wipers I to IV, inclusive, through the medium of the controlling relays associated therewith. By the operation of this switch a particular circuit breaker is selected. Fig. 1 also shows the polarized relay 55 which is controlled through the selecting switch of Fig. 4 to operate the selected circuit breaker to either close or open it. The polarized relay 55 and the relay 54 are employed in this control. The general release circuit, which is connected to the binding post $a$ and runs through the circuit breaker box to the key 60 terminates at ground on springs 603 in this last substation on the trunk line. With the key operated to close springs 602, 603, 604, and 605, the opening of one of the circuit breakers in the substation will operate general release circuit to release the circuit breakers in each of the other substations and the feeder circuit breaker at the despatcher's station for a purpose which will be hereinafter explained. With the key 60 thrown to close springs 601, the despatcher through operating relays 61 to 63, inclusive, can both open and close the circuit breaker at this substation over the general release circuit. This constitutes an emergency control to be used only in case the main control circuit is ineffective.

Figs. 2 and 5 show a similar substation, containing the selecting switch and associated relays in duplicate of that already explained, together with the polarized relay 55 and the relay 54 for controlling the selected circuit breakers. The substation also contains the key 60, through which the general release circuit is controlled. Unlike the substation shown in Fig. 1, the substation in Fig. 2 does not terminate the general release circuit, which enters the substation from the despatcher's station over the connecting pin $b$, is threaded through the relays and the key 60 out to the connecting pin $a$, from whence it goes to the next substation on the trunk. Otherwise the substation of Figs. 2 and 5 is a duplicate of Figs. 1 and 4 and need not be explained in greater detail here.

Figs. 3 and 6 show the equipment at the despatcher's station. The sending switch comprising wipers I–IV, inclusive, shown in Fig. 6 is a duplicate of that shown in Fig. 4 as are the relays associated with that switch to control it. In Fig. 3 I show two keys and associated relays which are individual to each of the circuit breakers to be controlled from that office. The keys 20 and 30, relays 22, 24, and 26 constituting a set for one device. In Fig. 3 I also show the relays 31 to 36, inclusive, which terminate the general release circuit, which comes into the substation over the connecting pin $b$ from the relay chain circuit. In Fig. 3 I also show the relay groups 41 to 44, inclusive, whose purpose and operation will be explained in detail hereinafter.

Fig. 7 shows a diagrammatic representation of the circuit breakers such as are indicated in the substation and controlled over the circuits shown throughout the figures. The circuit breakers comprise an energizing winding E which when energized moves the lever 701 to the left, to pull the carriage 702 to the left to close the brush 703 to energize the feeder from the main bus-bar. Connected to the carriage is a contact maker which is in engagement with contacts F/F when the circuit breaker is closed and with contacts F/O when the circuit breaker is opened. The latch 704 is pulled down into engagement with the member 701 by the holding magnet M, against the tension of spring 705. As long as the magnet M remains energized, the latch 704 holds the arm 701 in its energized position to keep the circuit breaker closed. When the magnet M is deenergized, the latch moves up under the control of spring 705, and the arm 701 is thrown to the right by springs 706, to open the circuit breaker. The draw bar 707 is a manually operated clip which can be removed to remove ground potential from the contacts F/F and F/O, to remove the circuit breaker from service, in a manner which will be hereinafter explained. This circuit breaker, while it does not form an integral part of the present invention, is shown by way of example only, as there are many other types of circuit breakers which could be used in connection with the present invention. Most likely if the amount of current that must be broken by the circuit breaker is great, the contact 703 will be immersed in oil, to prevent injurious sparking.

It is proposed to describe the operation when a circuit breaker which is connected to the odd contact 5, is put in, then the succeeding operations when the circuit breaker is automatically tripped, when the circuit breaker is tripped by an over-load, when the release is effected by means of the interrupter placed in the circuit breaker box, and when it is due to the breaking of the releasing pilot lead in the circuit of which are placed the circuit breaker boxes. The description will then deal with the control of the release, and then with the release by means of the draw bar placed in the circuit breaker cabinet.

The description will next deal with the safety devices, for which all the cases stated above will be examined. Finally a description will be given of the auxiliary devices which signal the breaking of a conductor, and the signalling and replacement of a broken down arrester.

CONTROL BY SELECTORS

The sequence of operations, which occur in the control, before causing, for example, the closure of the circuit breaker connected to the contact 5 will be first described.

It will be advisable at first to examine the position of the devices; all the circuit breakers to be controlled being in their normal or release position.

*At the controlling station A: (Fig. 3)*

The polarized relay 26 has its contacts pushed towards the negative sign, contacts 262, 264 are closed, 261, 263 open.

The controlling key 20 is in the "release" position, in which contact 201 is closed and 202 is open.

The alarm cut-off key 30 is in the position shown in the drawings, with contacts 301 and 303 closed.

The relay 24 is energized over: battery, upper winding of relay 24, 262, 201, earth.

The relay 22 is at rest. The green lamp (released) is lit in the circuit; battery, 303, lamp V, 264, earth.

*At the controlled station C: (Fig. 2)*

The polarized relay 55 has its contacts pushed towards the negative sign, contacts 553 are closed, 551, 552 open.

The key of the safety device 60 is in the position "circuit breaker under control of selector," with springs 602 to 606, inclusive, moved to the left.

The relay 54 is energized over: battery, winding of relay 54, 553 and earth over the draw bar release at the circuit breaker.

The relay 51 is energized (as this relay forms part of the common release circuit, the manner of its energization and its function is described later on).

The relays 52, 53 are in their normal condition.

In order to close the circuit breaker, the key 20 is released, the relay 24 falls back, the relay 22 is energized over: earth, 202, 241', relay 22, and is locked over: earth, 202, 222.

Battery is applied over the contact 221, 242 to the fifth contact of the contact bank III (Fig. 6).

*Impulsing*

The starting lead is closed at 242', which closes the circuit: left hand winding of relay 5, which is energized, 21, 242', first contact of contact bank II, and its wiper which is earthed over the back contact 41.

Relay 5 at 52, connects earth over 61 to the polarized relay 7 and on the synchronizing lead. The armature of relay 7 moves the contacts towards the mark (−). At all the controlled stations, the polarized relays are operated in the same way. The relays 1 at each station are energized by earth coming from 71, and at 11' connect earth to relays 2 over 43. Relays 2 are energized by battery reaching them over contacts 123, contacts 131 and the contacts of the rotary magnets in parallel and over the winding of these magnets. The rotary magnets are not energized in these circuits.

In the following remarks only the operation of Figure 6 will be considered but a similar operation takes place at the other stations shown in Figures 4 and 5, and they can be readily followed from the description herewith.

Relay 2 at contact 23 connects earth to the wiper of contact bank II over 51 and at 22 prepares a circuit for connecting earth in a parallel circuit to said wiper over the off-normal contact shown near the lower center of Figure 6, at 21 it opens the starting circuit, at 24 it energizes relay 4.

Relay 4 opens the circuit of relay 2, but relay 2 continues to be fed over contact 43, and its locking contact 24, so that if it falls back it can only be re-energized when relay 4 has also fallen back.

At 41 relay 4 opens the initial circuit over wiper of contact bank II, which however is still connected to earth over the contacts 22 and 23 as stated. At 42 it closes the following circuit: earth, contacts 51, 23, 73, contact 1 of the contact bank I, its wiper, back contact 62', front contact 52' operated, back contact 31, front contact 42, relay 11, contact 131 in parallel with the magnet contact, the rotary magnet, to battery. The rotary magnet is energized and opens its own contact, but is maintained energized over the contact 131, which does not open until the relay 11, which is slow in operating, has opened its contact 111. The relay 13 which was energized when earth was connected to wiper of contact bank II then falls back, opening its contacts 132, 133 and 131. This allows the rotary magnet to de-energize and advance the wipers onto the next contacts.

The off-normal contact is now closed, so that the feeding of earth to wiper of contact bank II is maintained until the switch returns to normal.

At the second contact the relay 6 is energized over: earth, wiper of contact bank II, the second contact and the left hand winding of relay 6.

As relay 5 is energized it is necessary in order to release it, for the polarized relay 7 to change its position and move into the middle position. It is however maintained in its position by the existing polarity on the synchronizing lead, which persists while any of the controlling or controlled stations have their relay 5 connecting battery at 52 to the synchronizing lead over the contact 61. This polarity is only removed when all the relays 6 have been energized, that is when all the switches have advanced one step, the delay of any one of them prevents all the others advancing further.

When all the switches have taken on step, there is no longer polarity on the synchronizing lead, and all the polarized relays return to the middle position, the relay 5 no longer receives earth over contact 73, and it falls back and connects the wiper I over the back contact 52' and the front contact 62' to the relay 11 and the rotary magnet.

The earth put on the synchronizing lead energizes the relays 7 in the negative sense. The operation of all the stations is the same as at Figure 6 which alone will be described. At 74 earth is put on the right hand winding of 6 over 62, earth is put on the even contacts of the contact bank I also over 74, and thence over front contact 62', back contacts 52' and 31, contact 42, relay 11, contact of rotary magnet, and said magnet to battery: the magnet is energized, and opens its armature contact and falls back, causing the wipers to advance onto the next contact.

The wipers being on the third contact, earth is put by the wiper of contact bank II on the third contact and the left hand winding of relay 5, which is energized; at 51 it disconnects earth from the synchronizing lead, and from the relays 7. As for the first step, relay 7 remains energized over earth coming from the stations which have not yet taken a second step. It does not return to the middle position until all relays 5 have been energized. Relay 7 being in the middle position, it removes earth at 74, and relay 6 falls back, connecting battery at 52 and 61 to the synchronizing lead and causing the relays 7 to move into the positive position. The operations then re-commence in the manner described for the first step.

The desired contact is reached

When the wipers reach the fifth contact 5, relay 6 is energized; in order to pass into the next position, the relay 5 has to be energized. But there is a preparatory control on this contact (relay 24 at rest, relay 22 energized, relay 26 on negative) which is connected over contact 241 to contact 122 of the dash pot relay. Relay 5 is not energized, hence the polarity—in the present case earth—is maintained on the synchronizing lead and causes all the switches in the different stations to stay on the fifth contact. Slow releasing relay 11, being no longer traversed by interrupted current for feeding the rotary magnet falls back; the relay 13 is energized by earth over contact 111. At 132 it closes the control circuit and at 133 it closes the signalling circuit at the same time as 131, thus establishing a circuit which prevents the switch rotating before the two first circuits have been opened.

Controlling the selected device

At the controlling station battery is put on the control lead over 242, 221, fifth contact of contact bank III, the wiper, contact 132. While at the controlled station (Figs. 2 and 5) this battery is transmitted by 132, wiper of contact bank III and the fifth contact, polarized relay 55, which operates in the direction to close contacts 551 and 552.

The relay 54 is maintained energized over 511, 545 and its upper winding; the relay 51 remains energized in series over the common release lead. The relay 55 at 551 closes the circuit: earth, release bar, 551, 543, 513, 522 and on the one hand over 531, 605, the winding E for inserting the circuit breaker, and on the other hand over 603 and the locking winding M of the circuit breaker.

When the circuit breaker is in, the interlock F/F closes and connects earth to relay 53, which is energized and opens at 531 the circuit of the energizing winding E of the circuit breaker.

Supervision

Relay 53 then locks itself over 534, 544, 552, to earth on the release bar. The earth, which was connected at 532 to the signalling lead for locking the relay 26 in the negative position, is replaced by a battery, which causes this relay to pass into the positive position. The lamp V which was lighted is now extinguished, and the following circuit is established: earth at contact 263, lamp R, contact 301, relay 23 and battery. The lamp does not light in series with the high resistance relay 23, but the relay 23 is energized and closes at 231 the circuit of relay 21, which is then energized. The energized relay 21 at its contact 211 connects up battery, thus enabling the lamp R to light and short circuiting the relay 23, which falls back and at 231 opens the circuit of relay 21.

The two relays are energized alternately and fall back in such a manner that the bell functions intermittently and the lamp flashes.

In order to stop the bell, it is only necessary to return the key 30 to the vertical position; the lamp then finds battery at contact 302; the relays 23 and 21 fall back. The key at 304 prepares the alarm circuit, which functions when the circuit breaker comes out.

*The switches return to normal*

The relay 26 in the positive position closes at 261 the following circuit: earth at 223, 261, relay 24 to battery, which relay 24 is energized and at 241' opens the circuit of relay 22, which has locked itself over the contact 222, and earth from the key 20. The relay 24 at 241 closes the circuit of relay 5 over: battery, left hand winding of 5, lower winding of relay 24, 241, fifth contact of contact bank II and its wiper to earth. Relay 5 is energized and the device is started again so that the wipers of all the switches are thereupon stepped to normal.

When the wipers of the switch again reach the first contract, relay 6 is energized and the polarized relay 7 is in the negative position. The off-normal contact is opened and removes earth from the earth lead. The relay 6 falls back, and the synchronizing lead has no polarity after all the switches have reached that position.

Relay 7 returns to the middle position. The relay 1 falls back, followed by relay 4, relay 2 and relay 11. The earth is again put at 41 on the wiper of contact bank II and it energizes the relay 13, thus again putting the switch in its initial condition.

*A switch gets out of step*

On starting up, the circuit of the dash pot 12, was closed over 61', 51', 111 to earth, the dash pot rises slowly. If the switch advances normally into the first position, the relay 11 is energized and the circuit of the dash pot is opened at 111 before it can close its contacts.

During the selection, if one of the switches fails to step, the rotary magnet oscillates to attempt to move the wipers into the next position. The relay 11 remains energized, but the relay 2, which is short circuited by the winding of this relay, falls back after a moment, earth is removed from wiper of contact bank II and over 22 is connected to the relay 3, which is energized in parallel with the left hand winding of relay 4. At 31 relay 3 replaces the earth coming from contact 73 or 74, 52', 62', wiper and contact bank I by that coming from the off-normal contact. Relay 2 having fallen back, relays 5 and 6 cannot be again energized. The switch is thus caused to rotate automatically in the circuit: earth at the off-normal contact back contact 22, front contact 31, front contact 42, relay 11 and the rotary magnet. It rotates until it has reached its normal position, in which earth is removed at the off-normal contact.

The relays 3 and 11 fall back in succession, so that the switch is returned to its initial position and does not leave it until it is started up again, which can be done automatically if the required control has not been effected. In that case the individual devices for this control remain in the operated position as long as the key 20 is raised.

The polarized relay of the switch continues to follow the changes in polarity of the synchronizing lead, but it cannot arrest the other switches. When all of them have returned to their normal position, the relays 1 and 4 fall back.

*The control fails*

Returning now to the positioning of the selecting switches upon contact 5, it may happen that the polarized relay 55 does not respond to the control of current because some circuit trouble, with the result that the operation attempted is not effected, the relay 54 is not energized, thus preventing the switches continuing their movement. At the end of the time determined by the time the dash pot takes to rise, this switch cuts itself out. To do so, the dash pot, at the end of its upward movement, closes the circuit from wiper on contact bank II, fifth contact of contact bank II, back contact 241, 122 and left hand winding of relay 5.

The relay 2, having had its circuit opened at 123, falls back, at 22 it removes earth from the wiper of contact bank II and puts it on the relay 3, which is energized with the left hand winding of relay 4. The switch automatically rotates as has been previously explained and is without effect on the other switches.

When all the switches have returned to normal, the control on the fifth contact remains, all the switches restart together and again try to execute the control and thus operate until the control has been effected or the supervisor removes the control. The switch also automatically cuts itself out of the circuit, if a bad contact is made or an interruption occurs in the circuit of the rotary magnet or in the circuits for energizing the relays 5 or 6.

In each of these cases it will be seen that the relay 11 falls back and that one of the relays 5 or 6 is at rest. The described circuit of the dash pot is established and the release is effected in the manner explained.

If an attempt is made to manually advance the wipers of a switch, the off-normal contact is closed and puts earth on the contact 22, thus energizing the relays 3 and 4. The switch is started up and automatically rotates back to its normal position; if during this rotation a starting up is effected by another station, the relay 2 cannot be energized, its circuit being open at 43, and the switch, which has been isolated, continues its rotation until it reaches its normal position. The relay 4 then remains energized by its right hand winding and the switch waits until all the others have reached this position, and it then starts with them if required.

RELEASE

1. *Automatic release*

It will be assumed that the circuit breakers corresponding to the fifth contact and the forty eighth contact 48 are in and that the circuit breaker 5 automatically comes out.

At the controlled station C: (Fig. 2)

F/F opens and interrupts the circuit for energizing the relay 53, which however remains locked by its holding circuit 534, 544, 552 and earth at draw bar.

The closing of the interlock F/O establishes the following circuit: earth, draw bar F/O left hand contact 604, 533, 512, winding of relay 52 and battery.

This relay is energized. By opening its contact 523 it inserts in the common release circuit a resistance of such magnitude that all the relays 51 and 32 in series with the pilot wire fall back. The common release circuit may be traced as follows: from ground through the working contact of spring 602 and said spring of the last controlled station (Fig. 1), winding of relay 51, armature 523 (in shunt of resistance), normally closed springs controlled by spring 601, circuit breaker cut-out box, lead *a* to working contact of spring 602 and said spring (Fig. 2), winding of relay 51, resistance, no longer shunted by armature 523, normally closed springs controlled by spring 601, circuit breaker cut-out box, lead *b*, winding of relay 32 (Fig. 3), spring 401, armature 331, armature 312, winding of relay 34, and armature 342 to battery.

a. *At the controlling station A:* (Fig. 3)

The relay 32 falling back inserts at 321 a guarding resistance to replace the resistance of station C, which will subsequently be short circuited.

At the front contact 322 it opens the circuit of the contact maker for holding the feeder circuit breaker, which releases, and at the back contact 322 it closes the following circuit: earth, 402, 322 back contact, front contact 341 (the relay 34 remaining energized although it remains in series with the resistance) and battery over the lamp DA (automatic release), which is lighted.

At the feeder the red lamp goes out and the green lamp is lighted.

b. *At the controlled station C:* (Fig. 2)

The relay 51 falls back, at 512 it opens the circuit of relay 52 (this falling back short circuits again the resistance inserted in the line) and then at 511 opens the locking circuit of relay 54, which falls back.

The relay 54 at 544 opens the locking circuit of relay 53, at 541 it closes the circuit for starting the switches and at 542 it opens the stopping circuit.

The switches (Fig. 4 or 5) are started up and they stop on the fifth contact in a similar way as described with relation to the switch in Fig. 6. Control circuits are established at the same time.

The relay 53 being de-energized connects earth to the polarized relay 26 of the controlling station A over the signalling lead, when the wiper IV reaches its fifth bank contact. Since the circuit breaker was in its closed position prior to the initiation of the present operation, key 30 is thrown to the right, with contacts 304 and 302 closed and 303 and 301 opened.

Relay 26 changes its position, it opens the contacts 261, 263, and closes 262, 264; the red lamp goes out, the green lamp is flashed, the alarm bell notifies the attendant in charge of the station that a change has occurred. The opening of the contact 261 does not de-energize the relay 24, which is locked over its contact 243'.

The contact 262 puts earth on the control lead over 223, 243', 262, 242, 221, etc.

The polarized relay 55 at the controlled station C passes into the negative position; at 553 it closes the circuit for energizing the relay 54, which at 542 releases the switches and they continue their movement.

Thus at this moment the individual controlled devices are found to be connected to the contact 5 in the initial position described above.

c. *At the controlled station B:* (Fig. 1)

Assuming the circuit breaker connected to contact 48 has come out the relay 51 falls back as before. At 513 it opens the holding circuit of the circuit breaker, by opening the contact 512 it prevents the relay 52 being energized by the closing of the interlock F/O, while at 511 it opens the circuit for locking relay 54, which falls back and closes the starting circuit of the switch at 541. At 542 it opens the stopping contact 48 and at 544 it opens the locking circuit of relay 53, which releases.

The switches stop on the contact 48. At the control station, the red lamp goes out, the green lamp flashes and connects earth to the control lead as described before.

At the controlled station B, the relay 55 changes its position, goes to the negative side; the relay 54 is energized, the switches return to normal.

Thus at the controlling station has been received the signal indicating the position of the circuit breakers which have just released.

Furthermore, the lamp DA (automatic release) associated with the route in which a circuit breaker has come out is lighted, indicating the nature of the change.

Each time a circuit breaker comes out the following operations are performed:

The alarm cut-off key is depressed, thereby at 303 connecting battery to the green lamp and at 301 preparing the flashing of the red lamp.

The control key 20 is depressed into the release position. At 201 the relay 24 is fed over: earth, 201, 232 and relay 24. (This is already locked over 243', 223, earth.)

At 202 the relay 22 is released.

Relay 22 falls back. The circuit breaker can be closed again.

This double operation having been performed for all the released circuit breakers the alarm ceases.

Then the common release key 40 is depressed into the release position.

At 403 the relay 31 is energized, which locks itself over 311, F/O earth. At 402 the lamp DA is extinguished.

The arrangement is now in the initial position as shown before the circuit breaker was put in. In order to again close the circuit breakers the operations previously described have to be performed.

*2. The feeder circuit breaker is automatically tripped*

The interlock F/F is opened, F/O is closed.

The red lamp is extinguished, the green lamp is lighted. There is the following circuit: earth, F/O, back contact 311, battery over the winding of relay 33, which is energized. The latter at 331 opens the circuit of the pilot lead, releasing the route in the manner described above.

*3. Release by means of the circuit breaker cut-out box*

All the circuit breakers feeding the route in question are in.

When the circuit breaker switches are operated in the circuit breaker boxes placed along the route, a high resistance is inserted in the pilot lead of the released route.

All the relays such as 51 in series in the pilot lead fall back. The circuit breakers controlled by these relays then at once open.

*1. At the controlling station A*

Relay 32 falls back as well as the relay 34; at 342 the short circuit of relay 36 is opened and relay 36 is energized.

The following circuit is established: earth, 402, back contact 341, front contact 361 and battery over the lamp DC (indicating release by circuit breaker box). The lamp is lighted.

The individual signals of the release of the circuit breaker of the route concerned appear at the control station A as described above.

*Method of operating.*—All the control and alarm keys 20 and 30 associated with the circuit breakers are put in the release position, that is with the odd numbered contacts closed.

On closing the switch at the circuit breaker box the resistance of the box is again short circuited.

The relay 34 is energized and at 341 it opens the circuit of the lamp D. C., which is extinguished. The relay 36, which is short circuited at 342, falls back.

It is possible to put the route under tension; to do so the key 40 is placed in the release position. The relay 31 is operated and locks itself.

When the key 40 is again raised, the relays 51 and 32 in series in the pilot lead are energized. The feeder circuit breaker is then put in and also each of the paralleling circuit breakers.

*4. Broken pilot lead*

When the pilot lead of the common release is severed, all the relays in series fall back; the circuit breakers come out, and the control station receives a special signal.

Relays 32, 34, 36 are all de-energized. Hence the lamp FC (lead severed) is lighted over: earth, 402, back contacts 322, 341, 361, lamp FC, battery.

*5. Control of individual release of a paralleling circuit breaker*

It will be assumed that the circuit breaker connected to the fifth contact has been closed.

*Position of the devices*

*Control station A.*—Individual devices control the fifth contacts (Fig. 6).

Control key 20 is in the "closed" position with 202 closed, 201 open; key 30, with 302 and 304 closed, 301, and 303 open. Red lamp R is lighted and relays 22, 24 energized.

Polarized relay 26 is in the positive position with 261, 263 closed and 262, 264 open.

*Controlled station C*

The holding magnet M of the circuit breaker is energized.

The circuit breaker closing magnet "E" is de-energized.

Relays 51, 53, 54 are energized, 52 is de-energized.

Polarized relay 55 is in the position in which 551 and 552 are closed, and 553 open.

The control key 20, corresponding to the circuit breaker to be released is put into the "release" position. At 202 the circuit of relay 22 is opened and this relay falls back. The latter in its turn at 223 opens the circuit of relay 24, which falls back.

The starting circuit of the switches is established and the stopping circuit is opened.

The switches operate as previously described and come to rest on the contact 5. The control circuits and the signalling circuits are established. Over the back contact 221 of relay 22 and the control lead an earth is connected to the polarized relay 55 at the controlled station C.

This relay opens its contacts 551, 552, and closes 553. At 551 it opens the circuit of the holding magnet "M", which on falling back releases the circuit breaker.

The interlock F/F leaves its contacts and opens the circuit of relay 53, which opens its holding circuit at 534, over 544, because 552 is open.

The interlock F/O closes, the relay 52 is not energized, because its circuit is immediately opened at 533, so as not to cause a general release.

The relay 53 having fallen back, an earth is sent over the back contact 532, and the signalling lead to the polarized relay 26 at the controlling station. Relay 26 opens 261, and 263, and closes 262, and 264.

The red lamp goes out, the green one flashes. The bell notifies the station superintendent that the desired control has been effected.

He lowers the alarm cut-out key 30.

At 262 the polarized relay 26 energizes the relay 24 over: earth, 201, 262, relay 24. The latter opens the starting circuit and again connects up the stopping circuit.

The switches return to their initial position.

6. *A paralleling circuit breaker is released by means of the draw bar on the carrier.*

The position of the devices is the same as that described at the beginning of the fifth case.

The opening of the draw bar removes earth from the relays 53, 54 and from the holding magnet "M."

The latter falls back and the circuit breaker comes out. The relay 52 cannot be energized, because the contact 533 is open before the draw bar is again closed.

The relays 53 and 54 cannot be again energized when the draw bar is closed, because the locking contacts 534 and 545 respectively are open.

The circuit of the energizing magnet "M" remains open at 543.

At 541, 542 the switches are started up and they are stopped on contact 5. (Figure 5.)

At the back contact 532 earth is connected to the signalling lead for relay 26 at controlling station. Relay 26 moves its contacts into the negative position. The red lamp goes out. The green one flashes and the bell rings. An earth is put over 223, 243', 262, 242, 221 on the control lead. The relay 55 moves its contacts into the negative position, thereby energizing the relay 54. The switches start up and return to their normal position, as before described.

*Auxiliary control*

It may be desirable, in some instances, to provide auxiliary control means for simultaneously energizing or releasing a plurality of circuit breakers located at different stations along a power line instead of singly operating such circuit breakers as has just been described. This auxiliary control means would also act as a safety arrangement for controlling the various circuit breakers in case the controlling means including the selectors are out of order.

This auxiliary control means is effective over the pilot release lead when the keys 60 at the substations are operated to the right to close springs 601 and its make contact and restore springs 602, 603, 604 and 605 so that the normally closed springs controlled by 602 and 603 are now closed, and so that springs 604 and 605 are in engagement with their respective right hand springs. When the keys 60 are operated to this position the energizing and locking magnets E and M are no longer controlled through the selector switches but are controlled by relays 61 to 63 over the release pilot lead. At the normally closed springs controlled by 602 relay 51 is disconnected from the pilot release lead and at 601 and its working contact relay 61 and associated resistance is inserted in the pilot release lead.

In order to explain the auxiliary control over pilot release lead it will first be assumed that all of the circuit breakers in all the substations are in released (or tripped) positions. Under these conditions a circuit may be traced for relay 63 as follows: ground at draw bar, interlock F/O, 604 and its back contact, and winding of relay 63 to battery. Relay 63, upon energizing, at armature 632 opens a shunt circuit from around the resistance and at armature 631 closes a circuit by way of 611 for energizing relay 62. At 623 relay 62 closes an obvious locking circuit for itself, at 621 short-circuits the resistance, and at 622 prepares circuits for energizing the closing and locking magnets E and M.

Since the feeder circuit breaker at the control station is assumed, at this time, to be out, relay 33 is energized from ground over FO, armature 311 and its resting contact, and winding of relay 33 to battery. Since neither relays 31 and 32 are in energized position at this time the resistance associated with relay 32 is included in the pilot release lead. Before proceeding further with the explanation it is believed advisable for a better understanding to trace the circuit of the release pilot lead through all the substations and control station at this time or at a time when all circuit breakers are out. The circuit of the pilot release lead may be traced from ground Fig. 1, normally closed springs controlled by 602, 621, winding of relay 61, 601 and its working contact, circuit breaker box, lead $a$ to the normally closed springs controlled by 602 (Fig. 2), 621, relay 61, 601 and its working contact, circuit breaker box, lead $b$ to Fig. 3, winding relay 32 and resistance associated therewith, back contact of armature 321 and said armature, winding of relay 34, and through contact 342 to battery. It should be mentioned here that the relays 61 and 32 are marginal and will not energize when any one of the resistances associated with relays 61 or the resistance associated with relay 32 is included in series in the release pilot lead. The relay 34, however, is maintained energized in series with such a resistance and relay 36 is shunted at armature 342. Relays 33 and 34 are therefore the only relays associated with the pilot release lead which are at this time in energized position.

Operation of closing

In order to operate the circuit breakers in the substations having their keys 60 operated as set forth, the despatcher will operate the key 40. At 403 key 40 closes a circuit through the left hand winding of relay 31 to energize such relay. At armature 311 relay 311 closes a locking circuit for its right-hand winding through interlock FO to ground, the circuit breaker feeder at the control station being in released position; and at armature 312 prepares a shunt circuit around the resistance associated with relay 32. When the despatcher releases key 40 relay 31 is maintained energized over its locking circuit and at springs 401 completes the shunt circuit around the resistance to cause relays 61 and 32 in the release pilot lead to energize. At armature 322 a circuit is completed for energizing the feeder circuit breaker relay by way of springs 402 and at armature 321 places a shunt around armature 312. Responsive to the operation of the feeder circuit breaker the interlock FO is opened and the interlock FF closed to extinguish lamp D and light lamp E. The locking circuit of relay 31 is opened at FO and the relay accordingly deenergizes to prepare the circuit for relay 33.

When the resistance in the release lead is shunted the relays 61 in the substations energize and at armature 612 completes circuits for energizing the closing and locking magnets, E and M, as follows: ground armature 612, normally closed springs controlled by spring 603 to locking magnet M and from ground at 612 by way of armature 622, back contact and spring 605 to closing magnet E. Responsive to the operation of the closing magnet E the interlock FO is opened and the interlock FF closed. The opening of interlock FO opens the circuit of relay 63 whereupon the relay deenergizes. At 631 relay 63 opens the locking circuit of relay 62 whereupon relay 62 deenergizes and at armature 632 short-circuits the resistances. At armature 622 the circuit of the closing magnet E is opened while the locking magnet is still maintained at armature 612. The opening of armatures 623 and 621 are without effect at this time. From the foregoing it can be seen that the despatcher can simultaneously close all the circuit breakers in the various substations which have their keys 60 thrown to the right as previously specified. It can also be seen that wherever the keys 60 are in their middle or non-operated positions, the circuit breakers thereat cannot be controlled over either the release pilot lead or over the selectors, thereby permitting such circuit breakers to be adjusted or repaired without danger of it being selected or operated by the despatcher.

RELEASE

1. Responsive to the release of one of the circuit breakers at the controlled stations the interlock F/F is opened and the interlock F/O is closed. Relay 63 is energized over: earth, draw bar, interlock F/O, 604 and relay 63 to battery. At 632 it opens the short circuit across the resistance and at 631 earths the circuit for energizing the relay 62, which however is open at 611.

The relays 61 and 32 in series with the pilot lead fall back at the controlled station, relay 62 is energized, again short circuiting the resistance, but the pilot lead relays are not energized because at the controlled station there is an equal resistance inserted by the release of armature 321. Relay 62 closes a locking circuit at 623 and at 622 it prepares the circuit for energizing the magnet for closing the circuit breaker.

At the controlling station the relay 32 has likewise fallen back, putting a guarding resistance in the pilot lead at 321, thus preventing the relays 61 of the controlled stations being energized when the relays 62 have been energized and the resistance at 621 shorted. Relay 32 at 322 opens the circuit of the holding magnet of the feeder circuit breaker, which releases, and at the same contact connects earth coming from 402 over 341 to the lamp DA, thus indicating that the release has been automatic and due to an over-load on the line.

The red lamp goes out and the green lamp is lighted by the closing of the interlock F/O. At the same time the relay 33 receives earth over this interlock and the back contact 311, so that it is energized.

To release the signal it is first necessary to put the key 40 in the position "released." The lamp DA is extinguished by having its circuit opened at 402, the relay 31 is energized by earth at 403 and the left hand winding. It is then locked over its right hand winding, its contact 311 and earth coming from the interlock F/O; relay 33 having its circuit opened at 311, falls back. The control devices have returned to their initial position before the closing control. This control is effected in the manner already described.

2. Release of the feeder circuit breaker

Assuming now that all of the circuit breakers are in and that the feeder circuit breaker has just released, the interlock F/O at the controlling station is closed and the interlock F/F is opened, thus extinguishing the red lamp and lighting the green lamp.

The relay 33 is energized by earth at the interlock F/O, back contact 311. It opens at 331 the short circuit of the resistance of 6,000 ohms, thereby causing the release of all the relays 61 and 32 in series over the pilot lead. The signalling is effected as in the previous case and by the same devices.

3. Release by cut-out box

The opening of the switch placed in a box inserts in the pilot release lead a resistance of 30,000 ohms. The relays in series with this lead fall back. At a controlled station the relay 61 falls back, opens at 612 the circuit of the holding magnet of the circuit breaker which comes out. The interlock F/O is closed. Relay 63 is energized and in turn energizes relay 62. The devices are then in the position corresponding to a circuit breaker released.

At the controlling station, the relay 32 falls back as well as the relay 34.

The relay 36 being no longer short circuited, it is energized.

The relay 32 at 322 opens the circuit of the holding magnet of the feeder circuit breaker, which comes out. The red lamp goes out and the green lamp is lighted. Relay 33 is energized. The lamp DC is lighted over front contact 361, back contacts 341 and 322, 402, earth.

The circuit breaker cannot be again closed so long as the switch box is open. Thus, on depressing the key 40 into the position "release" in order to prepare the closing operation, everything happens as for an ordinary release, but when the key is again raised for the closing control, the relays in series in the pilot lead cannot be energized on account of the resistance of the switch box, thus preventing the feeder circuit breaker being kept in at the controlling station, and at the controlled station the energizing and holding magnets cannot be energized because relays 61 are not energized.

4. Release by the breaking of a lead

When the pilot release lead is broken, the relays in series with this lead are released.

At the controlling station the operations are the same as when a circuit break cut-out box is opened, except that relay 36 cannot be energized. The lamp FC is lighted over back contacts 361 and 341, back contact 322–602. It is easy to see that, as in the preceding case, the circuit breaker cannot be again put in until the pilot lead has been repaired.

5. Controlled release

To control the general release of all the circuit breakers of the same route, it is only necessary to depress the key 40 into the position "released." The short circuiting of the 6,000 ohm resistance at the controlling station is opened at 401 and all the relays 61 and 32 in series with the pilot lead fall back, causing at the stations the release in the manner already explained.

At the controlling station the relay 31 is energized by its left hand winding and earth at 403. The relay 32 at 322 opens the circuit of the holding magnet of the feeder circuit breaker, which releases. The interlock F/O is closed, lighting the green lamp. The devices are then in the normal position "released" ready to transmit a control for closing.

6. Release by manual operation of draw bar

When the circuit breaker is put out of action by operating the draw bar located on its carrier, two cases can occur: (a) at the moment when it is put out of circuit, the circuit breaker is open, and the interlock F/O is closed. When the draw bar has been operated, the relay 63 no longer finds earth at the interlock F/O and releases, cutting out 62, which falls back. When the control for closing is given, 61 will be energized, at 612 it will close its front contact, which puts earth only on the holding magnet of the circuit breaker. Hence it cannot close.

Devices for Routes Without Feeder Circuit Breakers

In the modification where the route is only fed by paralleling circuit breakers, the controlling and signalling devices are slightly different in that in this case the controlling relays associated with the pilot release lead need not be controlled by the circuit breaker interlock contacts and key 40 but directly by the use of key 50 as will appear in the following description.

1. Control for closing modification

As in the preceding case, the key 50 is in the position "release" and the relay 44 is energized in series with the resistance associated with relay 42 and the relays 41, 42 and 43 are at rest.

To effect the control, the key 50 is operated. At 502 key 50 energizes relay 41 which locks itself at its front contact 412, 441 and 422. When the key 50 is released the resistance, which was inserted in the pilot lead, is short circuited at 501 and 413. The relays 61 and 42 in series with the pilot lead are energized and the control is effected at the controlled stations in the manner already explained.

The relay 42 is energized, at 422 it disconnects earth for holding relay 41, which falls back, while at 421 the resistance is short circuited.

2. Automatic release

This release is signalled by inserting a resistance of 6,000 ohms in the pilot lead. The relays in series with the pilot lead fall back, and these include the relays 61 at the substations and the relay 42 at the controlling station. The relay 41 is not energized, because its circuit is all the time open at the key 50 and at 413. Therefore the lamp DA is lighted over the back contact 412, front contact 441 and back contact 422. Relays 61 control the release of the circuit breakers as previously described.

In order to insert the circuit breakers, it is necessary to operate the key 50 as previously described.

3. Release by cut-out box

That is to say putting a high resistance in series with the release lead.

When the box is opened and the high resistance inserted in the pilot lead the relays 61 in series in the pilot lead fall back, and relays 42, 44 likewise fall back. Relay 43, however, is energized, 41 remains de-energized, the lamp DC is lighted over: front contact 431, back contacts 411 and 441 and 422.

The device is again put into the position for controlling the closing in the manner already described.

4. Broken lead

When the release pilot lead breaks all relays in series with the pilot lead. Relays 41 and 43 remain at rest. The lamp FC is lighted over: back contacts 431, 411 and 441, earth at the back contact 422.

5. Control for releasing

In order to effect the general release of all the circuit breakers, it is only necessary to depress the key 50 into the release position. Thus the resistance of 6,000 ohms is inserted in the pilot lead, thereby causing the release of all the relays 61 in the controlled stations in the manner described above.

Auxiliary Circuits

*Circuit for signalling a broken control or signalling lead*

The selectors being at normal, the relay 13 is energized by earth, 41, 111, its winding and battery. There are thus the following circuits:

*The controlling station (Fig. 6)*

Intermediate pole of battery, first contact and wiper of segment III, 132, control lead.

At the last station (controlled station C: Fig. 4) control lead 132, wiper and first contact of segment III, winding of relay 15, first contact and wiper IV, 133, signalling lead.

*At the controlling station (Fig. 6)*

Signalling lead 133, wiper and first contact of segment IV, relay 15, earth.

It is clear that the circuit will be open when either a control or signalling lead is broken.

At the controlling station the relay 15 falls back when either a control or a signalling lead is broken, the signalling lamp is lighted over: earth, 41, wiper and first contact of segment 11, 151, lamp, battery.

*Circuit for signalling a condenser is damaged (relay 17)*

The spark extinguishing condensers of the common devices have a return path over back contact 171 and a non-inductive resistance.

To the terminals of this resistance are connected the winding of relay 17. When a condenser becomes short circuited, this relay receives battery over the winding of a relay forming part of the faulty circuit; the relay 17 is energized in series with it; at its back contact 171 it inserts a safety condenser and at its front contact 171 it lights the signalling lamp over the winding of the relay and locks the relay.

What I claim as new and desire to secure by Letters Patent is:—

1. In a remote control system, a plurality of switching devices, a key individual to each device, each key having two positions, a selector switch individual to each device, means for synchronously operating said selector switches, a single conductor common to all said devices, means including circuits controlled through each individual key in its first position by said synchronously operated selector switches for individually operating and supervising all of said devices having their individual keys in first position, and means including circuits controlled through each individual key in its second position over said single conductor for simultaneously operating and supervising all of said devices having their individual keys in second position independently of said selector switches.

2. In a remote control system, a plurality of switching devices, synchronously operated selectors, a single conductor common to all said devices, a key individual to each device, each key having three positions, means including circuits controlled by said synchronously operated selectors through the individual key of each device in its first position for individually operating and supervising each device, means including circuits controlled over said single conductor through all the keys in their second positions for simultaneously operating and supervising all such devices, and means for isolating the operating circuits of each device from control over said single conductor and from control over said selector switches in case the individual keys are in their third positions.

3. In a remote control system, a plurality of switching devices each having an open and a closed position, a series circuit including a relay individual to each device, said relays energized over said series circuit in case said devices are in their closed positions, means for automatically releasing any one of said devices to its open position, means individual to each device operated responsive to such device reaching its open position for opening a point in said series circuit to release all of said relays, means for simultaneously releasing all of the remaining devices to their open position responsive to the release of said relays, means individual to each device operated responsive to the operation of said individual circuit opening means for placing a shunt circuit around said points opened by said individual circuit opening means to prepare said relays for operation over said series circuit, a key common to all said devices, means responsive to an operation and a release of said key for completing said series circuit to simultaneously energize all said relays by way of said shunt circuits, and circuits completed by the energization of each of said relays for operating said devices to their closed positions.

4. In a remote control system, a control station and a plurality of sub-stations, a relay at each sub-station and control station, an energizing circuit for said relays comprising only a single conductor connecting said sub-stations in series to the control station, means at any of said sub-stations for automatically including a resistance in said series circuit to deenergize all said relays, means at each substation operated in response to the deenergization of the relay thereat for automatically closing a shunt circuit around said resistance to prepare said series circuit to enable the reenergization of said relays, a resistance at the control station, means at the control station operated in response to said first means for including said last resistance in said series circuit to prevent the reenergization of said relays, and means at said control station for shunting said last resistance to complete said series circuit to simultaneously reenergize said relays.

In testimony whereof I have signed my name at Paris, France, this 18th day of August, 1926.

ROGER BATAILLE.